(12) United States Patent
Kim et al.

(10) Patent No.: US 9,843,420 B2
(45) Date of Patent: Dec. 12, 2017

(54) CROSS CARRIER SCHEDULING METHOD AND APPARATUS

(71) Applicant: ELECTRONICS AND TELECOMMUNICATIONS RESEARCH INSTITUTE, Daejeon (KR)

(72) Inventors: Kyung Sook Kim, Daejeon (KR); Sang Chul Oh, Daejeon (KR); Byung-Han Ryu, Daejeon (KR); Yeon Seung Shin, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 125 days.

(21) Appl. No.: 14/565,780

(22) Filed: Dec. 10, 2014

(65) Prior Publication Data

US 2015/0180623 A1 Jun. 25, 2015

(30) Foreign Application Priority Data

Dec. 24, 2013 (KR) ........................ 10-2013-0163037

(51) Int. Cl.
*H04L 1/18* (2006.01)
*H04L 5/00* (2006.01)
(Continued)

(52) U.S. Cl.
CPC ............ *H04L 1/1854* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2013/0083707 A1* 4/2013 Wang ................ H04W 72/1289
370/280
2013/0107809 A1 5/2013 Ko et al.
(Continued)

FOREIGN PATENT DOCUMENTS

KR 10-2013-0032798 A 4/2013
KR 10-2013-0093633 A 8/2013

OTHER PUBLICATIONS

Choi et al. (U.S. Appl. No. 61/826,502), "Methods for CSI Feedback on Dual Connectivity", filed May 23, 2013.*
(Continued)

*Primary Examiner* — Christopher Crutchfield
*Assistant Examiner* — Thinh Tran
(74) *Attorney, Agent, or Firm* — NSIP Law

(57) ABSTRACT

A cross carrier scheduling method is provided by a terminal. The terminal receives a control element including cross carrier scheduling configuration information from a base station, and sets a scheduling cell of a secondary cell in accordance with the cross carrier scheduling configuration information. The terminal starts to monitor scheduling information of the secondary cell at the scheduling cell from a time predefined between the base station and the terminal.

20 Claims, 6 Drawing Sheets

(51) Int. Cl.
*H04W 72/12* (2009.01)
*H04W 28/06* (2009.01)

(52) U.S. Cl.
CPC ....... *H04L 5/0055* (2013.01); *H04W 72/1289* (2013.01); *H04W 28/06* (2013.01)

(56) References Cited

U.S. PATENT DOCUMENTS

| | | | |
|---|---|---|---|
| 2013/0258864 A1 | 10/2013 | Chen et al. | |
| 2013/0279432 A1 | 10/2013 | Li et al. | |
| 2014/0029459 A1* | 1/2014 | Kwon | H04W 76/048 370/252 |
| 2014/0321408 A1* | 10/2014 | Kim | H04L 5/001 370/329 |
| 2015/0282134 A1* | 10/2015 | Suzuki | H04L 5/0044 370/329 |
| 2016/0134351 A1* | 5/2016 | Choi | H04L 1/0026 370/328 |

OTHER PUBLICATIONS

R1-124789, "Cross carrier scheduling with EPDCCH", 3GPP TSG RAN WG1 Meeting #71, New Orleans, Nov. 2012.*
R1-124767, "Cross carrier scheduling for E-PDDCH", 3GPP TSG RAN WG1 Meeting #71, New Orleans, Nov. 2012.*

* cited by examiner

FIG. 2

| SCellIndex | scheduling CellId | CIF-presence |

FIG. 3

| SCellIndex | scheduling CellId | pdsch-start |

CROSS CARRIER SCHEDULING METHOD AND APPARATUS

CROSS-REFERENCE TO RELATED APPLICATION

This application claims priority to and the benefit of Korean Patent Application No. 10-2013-0163037 filed in the Korean Intellectual Property Office on Dec. 24, 2013, the entire contents of which are incorporated herein by reference.

BACKGROUND (a) Field

The present invention generally relates to a cross carrier scheduling method and apparatus.

(b) Description of the Related Art

Recently, a carrier aggregation is developed as a scheme for extending service bandwidths. By using the carrier aggregation, a terminal can simultaneously receive a service from a primary cell and a plurality of secondary cells.

A cross carrier scheduling is an example of the carrier aggregation, and is a scheme for transmitting data transmission information of other carrier through a physical downlink control channel (PDCCH) of one carrier. The PDCCH of one carrier can transfer resource allocation information of a physical downlink shared channel (PDSCH) and a physical uplink shared channel (PUSCH) transmitted or received through own carrier, and resource allocation information of the PDSCH and the PUSCH transmitted or received through other carrier, by using a carrier indicator field (CIF). If the cross carrier scheduling is used when the plurality of secondary cells are set, the terminal can perform PDCCH monitoring for only a carrier requiring the PDCCH monitoring, thereby reducing consumption of a battery.

Scheduling configuration information of the secondary cell set to the terminal may be changed in the cross carrier scheduling. In this case, a base station transmits to the terminal a radio resource control (RRC) reconfiguration request message including cross carrier scheduling configuration information. The terminal changes the cross carrier scheduling configuration information of the secondary cell indicated by the RRC reconfiguration request message, and transmits a RRC reconfiguration complete message to the base station. When changing the cross carrier scheduling configuration information of the secondary cell, the terminal starts the PDCCH monitoring for reconfigured scheduling cell of the secondary cell according to the changed cross carrier scheduling configuration information.

In the case that the base station applies the PDCCH transmission in the reconfigured scheduling cell at a time when receiving the RRC reconfiguration complete message, a time when the base station transmits the PDCCH to the reconfigured scheduling cell is inconsistent with a time when the terminal monitors the PDCCH of the reconfigured scheduling cell. Alternatively, in the case that the base station applies the PDCCH transmission in the reconfigured scheduling cell at a time when transmitting the RRC reconfiguration request message, a time when the base station transmits the PDCCH to the reconfigured scheduling cell is inconsistent with a time when the terminal monitors the PDCCH of the reconfigured scheduling cell. Accordingly, during the inconsistent period, data transmission or reception to the secondary cell can be discontinued, and unnecessary signaling overhead can occur.

SUMMARY

An aspect of the present invention provides a cross carrier scheduling method and apparatus for making an application time of scheduling cell configuration information of a secondary cell consistent between a base station and a terminal.

According to another aspect of an embodiment of the present invention, a cross carrier scheduling method is provided by a terminal. The method includes receiving a control element including cross carrier scheduling configuration information from a base station, setting a scheduling cell of a secondary cell in accordance with the cross carrier scheduling configuration information, and starting to monitor scheduling information of the secondary cell at the scheduling cell from a time predefined between the base station and the terminal.

The predefined time may be a time when a predetermined time is elapsed from a transmission time of the control element.

In this case, the transmission time of the control element may be a subframe in which the control element is transmitted.

The predefined time may be a time after a hybrid automatic retransmit request (HARQ) timing to the control element.

The cross carrier scheduling configuration information may include an index of the secondary cell and an identifier of the scheduling cell.

In this case, setting the scheduling cell may include, when the index indicates the secondary cell set to the terminal, setting the scheduling cell of the secondary cell to a scheduling cell indicated by the identifier.

Starting to monitor the scheduling information may include starting to monitor the scheduling information of the secondary cell at the scheduling cell when the secondary cell is in an activation state.

According to yet another embodiment of the present invention, a cross carrier scheduling method is provided by a base station. The method includes transmitting to a terminal a control element including cross carrier scheduling configuration information, receiving an ACK to the control element from the terminal, setting a scheduling cell of a secondary cell in accordance with the cross carrier scheduling configuration information, and indicating to transmit scheduling information of the secondary cell at the scheduling cell from a time predefined between the base station and the terminal.

The predefined time may be a time when a predetermined time is elapsed from a transmission time of the control element to which the ACK is received.

In this case, the transmission time of the control element may be a subframe in which the control element is transmitted.

The predefined time may be a time after a timing of the ACK.

The cross carrier scheduling configuration information may include an index of the secondary cell and an identifier of the scheduling cell.

In this case, setting the scheduling cell may include, when the index indicates the secondary cell set to the terminal, setting the scheduling cell of the secondary cell to a scheduling cell indicated by the identifier.

Indicating to transmit the scheduling information may include indicating to transmit the scheduling information of the secondary cell at the scheduling cell when the secondary cell is in an activation state.

According to further aspect of the present invention, a cross carrier scheduling apparatus including a transceiver and a processor is provided. The transceiver receives a control element including cross carrier scheduling configuration information from a base station. The processor sets a scheduling cell of a secondary cell in accordance with the cross carrier scheduling configuration information, and starts to monitor scheduling information of the secondary cell at the scheduling cell from a time predefined between the base station and the terminal.

The predefined time may be a time when a predetermined time is elapsed from a transmission time of the control element.

The predefined time may be a time after an HARQ timing to the control element.

According to further aspect of the present invention, a transceiver transmits to a terminal a control element including cross carrier scheduling configuration information, and receives an ACK to the control element from the terminal. A processor sets a scheduling cell of a secondary cell in accordance with the cross carrier scheduling configuration information, and indicates to transmit scheduling information of the secondary cell at the scheduling cell from a time predefined between the base station and the terminal.

The predefined time may be a time when a predetermined time is elapsed from a transmission time of the control element to which the ACK is received.

The predefined time may be a time after a timing of the ACK.

BRIEF DESCRIPTION OF THE DRAWINGS

FIG. 2 shows a cross carrier scheduling command MAC control element in a cross carrier scheduling method according to an embodiment of the present invention.

FIG. 3 shows a cross carrier scheduling command MAC control element in a cross carrier scheduling method according to another embodiment of the present invention.

DETAILED DESCRIPTION OF THE EMBODIMENTS

Figure 1A:
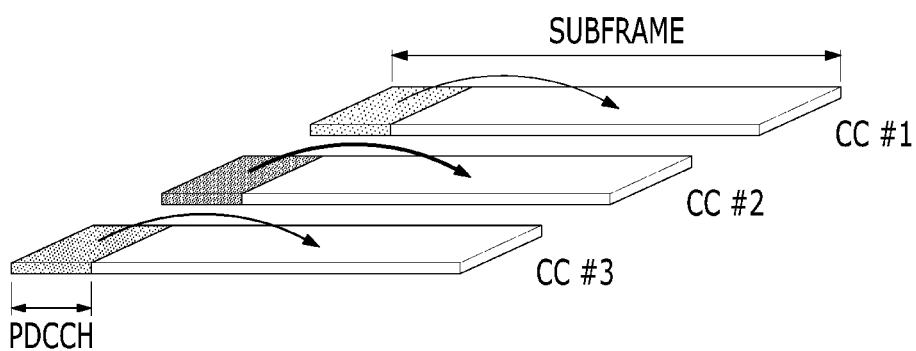
FIG. 1A and FIG. 1B show a concept of a cross carrier scheduling.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a user equipment (UE), a mobile terminal (MT), a mobile station (MS), an advanced mobile station (AMS), a high reliability mobile station (HR-MS), a subscriber station (SS), a portable subscriber station (PSS), an access terminal (AT), and so on, or may include all or some functions thereof.

Further, the term "base station" (BS) may designate a node B, an evolved node B (eNodeB), an advanced base station (ABS), a high reliability base station (HR-BS), an access point (AP), a radio access station (RAS), a base transceiver station (BTS), and so on, or may include all or some functions thereof.

Now, a cross carrier scheduling method and apparatus according to an embodiment of the present invention is described with reference to the drawings.

First, a cross carrier scheduling according to an embodiment of the present invention is described with reference to FIG. 1A and FIG. 1B.

Figure 1B:
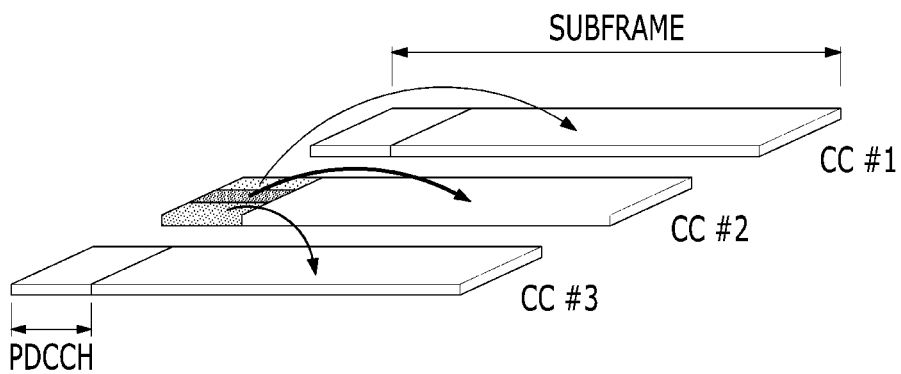

FIG. 1A and FIG. 1B show a concept of a cross carrier scheduling.

Referring to FIG. 1A, when the cross carrier scheduling is not used, a PDCCH of each carrier, i.e., component carrier (CC) indicates resource allocation information of a physical downlink shared channel (PDSCH) and a physical uplink shared channel (PUSCH) which it transmits or receives.

However, when the cross carrier scheduling is used, as shown in FIG. 1B, a PDCCH of one carrier transfers the resource allocation information of the PDSCH and PUSCH which are transmitted or received through other carrier(s) as well as the resource allocation information of the PDSCH and PUSCH which it transmits or receives. A carrier (i.e., a component carrier) for transmitting or receiving the resource allocation information of the other carrier is referred to as a scheduling cell. Other carrier (i.e., other component carrier) whose the resource allocation information is transferred by the PDCCH of the scheduling cell is referred to as a secondary cell (SCell).

The base station provides a terminal with cross carrier scheduling configuration information of the secondary cell. Then, when receiving an activation command for configured secondary cell from the base station, the terminal, based on the cross carrier scheduling configuration information, monitors the PDCCH of the secondary cell in case of using no cross carrier scheduling and monitors the PDCCH of a cell scheduling the secondary cell in case of using the cross carrier scheduling.

FIG. 2 and FIG. 3 each shows a cross carrier scheduling command MAC (medium access control) control element in a cross carrier scheduling method according to an embodiment of the present invention.

Referring to FIG. 2 and FIG. 3, a base station transmits a cross carrier scheduling command MAC control element to the terminal to provide cross carrier scheduling configuration information.

The cross carrier scheduling command MAC control element includes secondary cell index information (SCellIndex) and scheduling cell identifier information (schedulingCellId). The secondary cell index information (SCellIndex) indicates an identifier of a secondary cell configured for (or set for) the terminal, and the scheduling cell identifier information (schedulingCellId) indicates an identifier of a scheduling cell for the secondary cell.

When the cross carrier scheduling is not used, the secondary cell is equal to the scheduling cell (SCellIndex=schedulingCellId). In this case, the cross carrier scheduling command MAC control element further includes CIF-presence for indicating that a CIF (carrier indicator field) exists in a PDCCH of the secondary cell. Accordingly, the terminal can identify the resource allocation information of the PDSCH and PUSCH that are transmitted or received to the secondary cell at the secondary cell.

When the cross carrier scheduling is used, the secondary cell is different from the scheduling cell (SCellIndex≠schedulingCellId). In this case, the cross carrier scheduling command MAC control element further includes pdsch-start for indicating a position of a symbol on which the PDSCH of the secondary cell starts. Accordingly, the terminal can identify the PDSCH of the secondary cell by using the PDCCH information of the scheduling cell and the pdsch-start.

The base station may change the scheduling cell configured for the terminal under a certain condition. For example, if an average load of PDCCH resources is greater than a reference value in the scheduling cell configured for the terminal, the base station may configure (or set) a serving cell whose average load of PDCCH resources is less than the reference value from among serving cells configured for the terminal as a scheduling cell of the secondary cell. If a radio channel quality of the scheduling cell of the secondary cell configured for the terminal is less than a reference value by movement of the terminal or inter-cell interference, the base station may configure a serving cell whose radio channel status is better than the scheduling cell of the secondary cell as a scheduling cell of the secondary cell. If an average service traffic amount to the secondary cell configured for the terminal is less than a reference value, the base station may configure a primary cell of the terminal or a serving cell whose average service traffic amount to the terminal is greater than the reference value as a scheduling cell of the secondary cell.

As such, after configuring new scheduling cell, the base station transmits the cross carrier scheduling command MAC control element to the terminal. The cross carrier scheduling command MAC control element may be transmitted through a MAC PDU (protocol data unit) in a predetermined subframe.

Next, an operation of the terminal after receiving the cross carrier scheduling command MAC control element from the base station is described with reference to FIG. 4.

Figure 4:
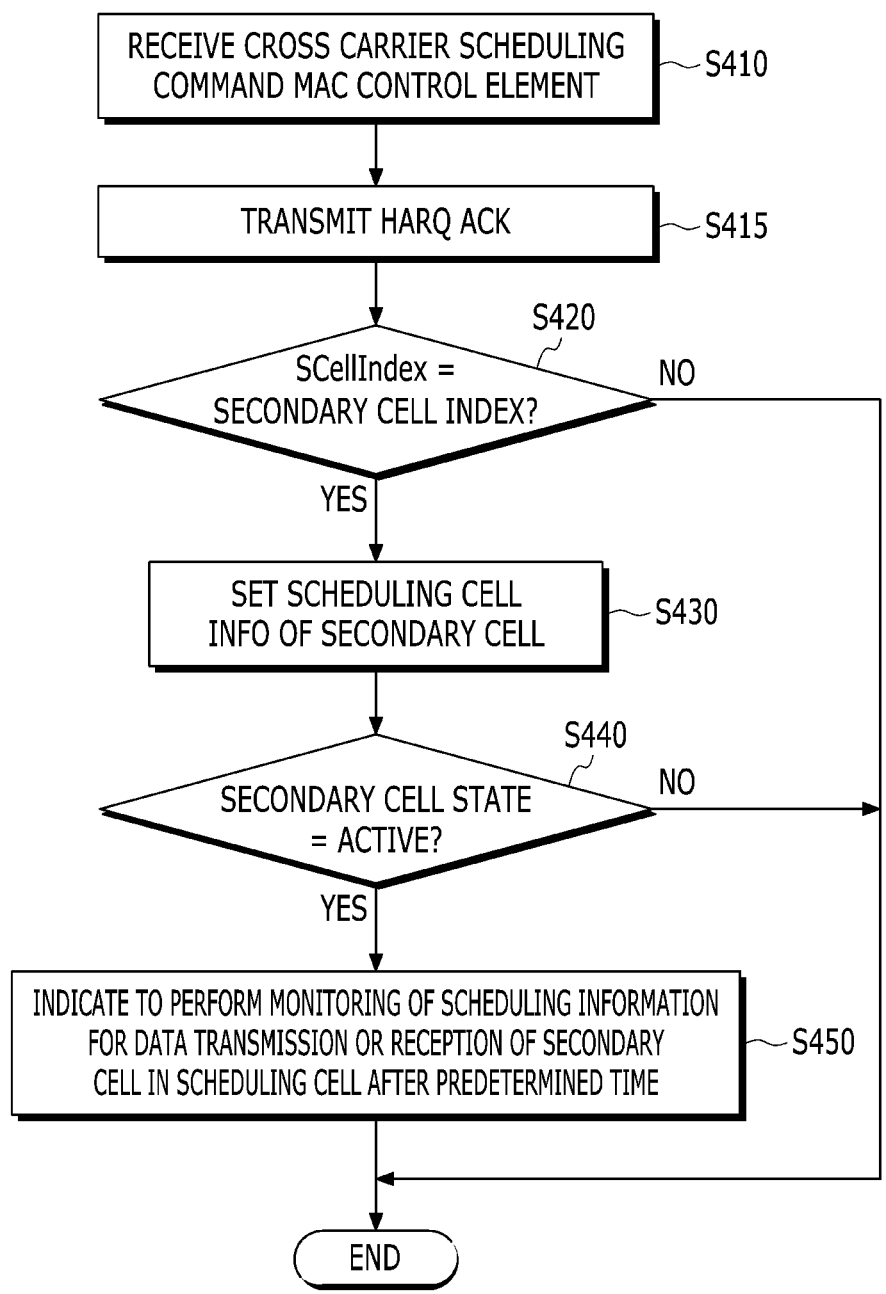
FIG. 4 is a flowchart showing a procedure processing a cross carrier scheduling command MAC control element by a terminal in a cross carrier scheduling method according to an embodiment of the present invention.
Figure 5:
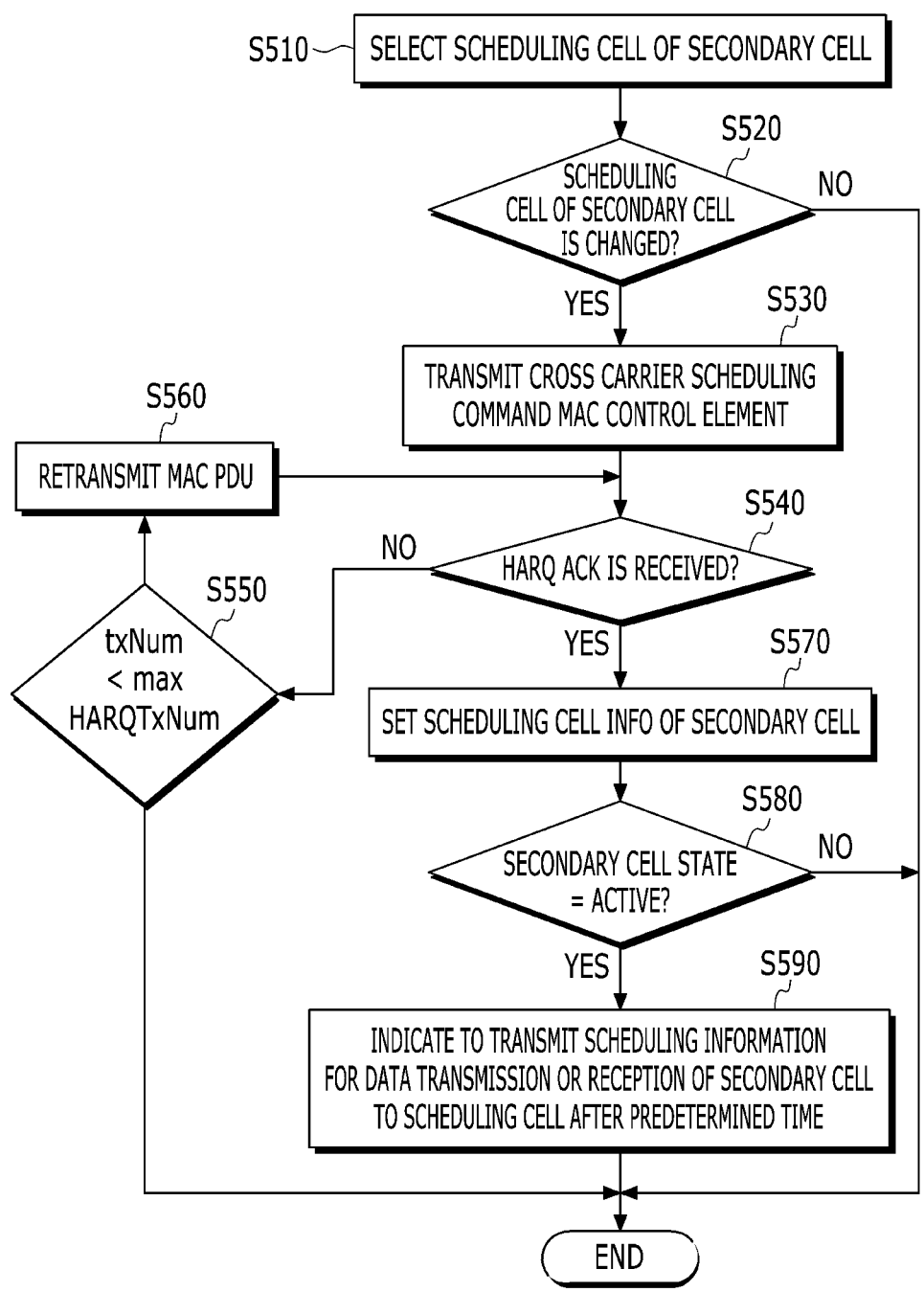
FIG. 5 is a flowchart showing a procedure processing a cross carrier scheduling command MAC control element by a base station in a cross carrier scheduling method according to an embodiment of the present invention.

FIG. 4 is a flowchart showing a procedure processing a cross carrier scheduling command MAC control element by a terminal in a cross carrier scheduling method according to an embodiment of the present invention, and FIG. 5 is a flowchart showing a procedure processing a cross carrier scheduling command MAC control element by a base station in a cross carrier scheduling method according to an embodiment of the present invention.

Referring to FIG. 4, a terminal receives from a base station a cross carrier scheduling command MAC control element including cross carrier scheduling configuration information (S410). The cross carrier scheduling configuration information includes a secondary cell index (SCellIndex) and a scheduling cell identifier (schedulingCellId), and may further include CIF-presence or pdsch-start. When successfully receiving a MAC PDU including the cross carrier scheduling command MAC control element, the terminal transmits to the base station an acknowledgement (ACK) as a hybrid automatic retransmit request (HARQ) feedback (S415). On failing to receive the MAC PDU, the terminal transmits to the base station a non-acknowledgement (NACK) as the HARQ feedback, and receives a MAC PDU retransmitted by the base station again.

The terminal compares the secondary cell index (SCellIndex) included in the cross carrier scheduling command MAC control element with a secondary cell index set to the terminal, and determines whether the secondary cell index (SCellIndex) included in the cross carrier scheduling command MAC control element indicates the secondary cell set to the terminal (S420). When the secondary cell index indicates the secondary cell set to the terminal, the terminal changes cross carrier scheduling configuration information of the secondary cell according to the cross carrier scheduling command MAC control element information (S430). If the secondary cell index does not indicate the secondary cell set to the terminal, the terminal ignores the cross carrier scheduling command MAC control element.

Next, when the secondary cell is in an activation state (S440), the terminal monitors a PDCCH of a new scheduling cell configured according to the cross carrier scheduling configuration information, thereby monitoring scheduling information for data transmission or reception at the secondary cell (S450). The terminal starts to monitor the PDCCH from a time that is predefined between the base station and the terminal.

Next, referring to FIG. 5, the base station selects a scheduling cell of a secondary cell (S510). When a scheduling cell of the secondary cell is changed by the selected scheduling cell (S520), the base station transmits to the terminal a cross carrier scheduling command MAC control element including the changed cross carrier scheduling configuration information (S530). The cross carrier scheduling configuration information includes a secondary cell index (SCellIndex) and a scheduling cell identifier (schedulingCellId), and may further include CIF-presence or pdsch-start.

After transmitting the cross carrier scheduling command MAC control element to the terminal, the base station determines whether to receive from the terminal an ACK to a MAC PDU including the cross carrier scheduling command MAC control element (S540). When failing to receive the ACK from the terminal (S540), the base station compares a transmission number (TxNum) of the MAC PDU including the cross carrier scheduling command MAC control element with a maximum retransmission number (max HARQTxNum) (S550). If the transmission number (TxNum) of the MAC PDU is less than the maximum retransmission number (max HARQTxNum), the base station retransmit the MAC PDU (S560).

On receiving the ACK from terminal (S540), the base station configures scheduling cell information of the secondary cell according to the selected scheduling cell (S570). When the secondary cell is in an activation state (S580), the base station indicates to transmit scheduling information for data transmission or reception at the secondary cell on the PDCCH of the configured scheduling cell according to the cross carrier scheduling command MAC control element information (S590). A time for transmitting the scheduling information on the PDCCH of the configured scheduling cell is applied from a time that is predefined between the base station and the terminal.

In an embodiment of the present invention, the time predefined between the base station and the terminal may be set to a time when a predetermined time (t) elapses from a subframe transmitting the cross carrier scheduling command MAC control element which the terminal successfully receives. The base station can obtain information about the transmission subframe of the cross carrier scheduling command MAC control element which the terminal successfully receives based on an HARQ ACK to the cross carrier scheduling command MAC control element transmitted by the base station. The predetermined time (t) may be set to a same value for both the base station and the terminal, and may be set by HARQ feedback timing. For example, the predetermined time (t) may be set to 8 ms when the HARQ ACK is transmitted at subframe #(n+4) after four subframes from a transmission subframe #n of the cross carrier scheduling command MAC control element in a frequency division duplex (FDD) mode.

As described above, according to an embodiment of the present invention, when a scheduling cell of a secondary cell set to the terminal is reconfigured, a time when scheduling cell configuration information of the secondary cell can be consistent between the base station and the terminal. Therefore, unnecessary signaling overhead and service disconnection can be prevented, and cross carrier scheduling configuration information can be freely changed.

While a case that one base station provides a service through a plurality of carriers (i.e., component carriers), by way of non-limiting example, has been described in an embodiment of the present invention, a cross carrier scheduling method and apparatus according to an embodiment of the present invention may be applicable to a set of carriers that are used in different base stations connected through backhaul.

Figure 6:
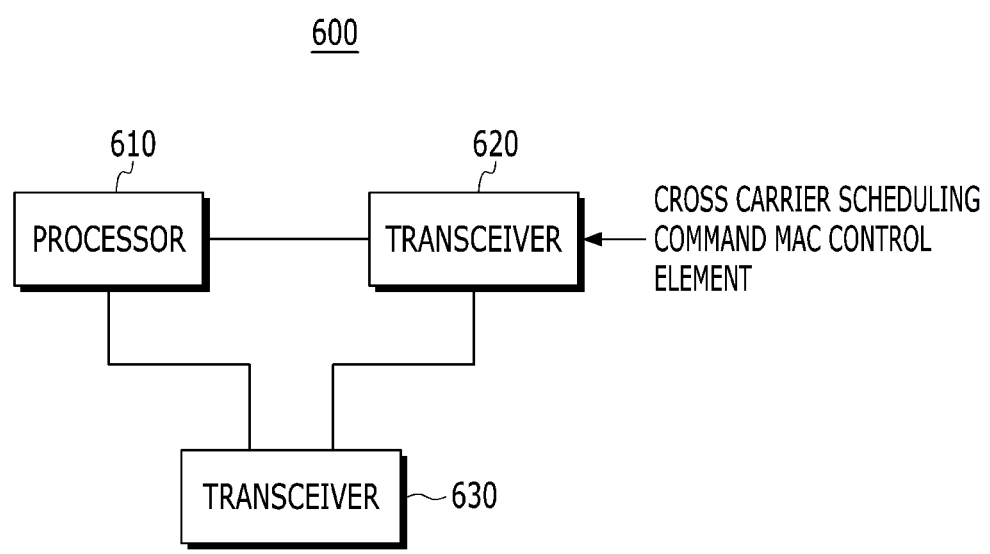
FIG. 6 is a block diagram showing a cross carrier scheduling apparatus according to an embodiment of the present invention.
Figure 7:
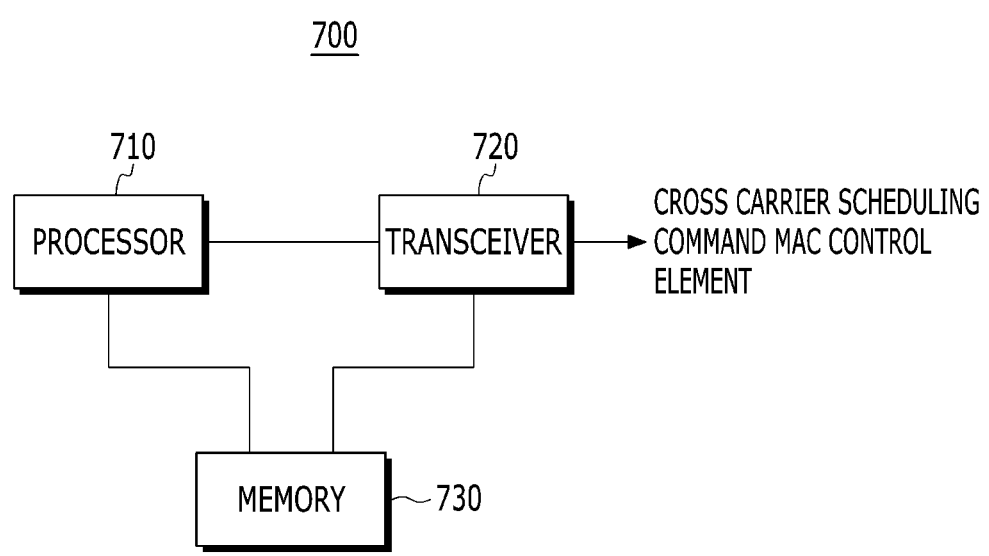
FIG. 7 is a block diagram showing a cross carrier scheduling apparatus according to another embodiment of the present invention.

FIG. 6 and FIG. 7 each is a block diagram showing a cross carrier scheduling apparatus according to an embodiment of the present invention.

Referring to FIG. 6, a cross carrier scheduling apparatus 600 includes a processor 610, a transceiver 620, and a memory 630.

The transceiver 620 receives from a base station a cross carrier scheduling command MAC control element including cross carrier scheduling configuration information, and transmits an ACK to the base station if succeeding in receiving the MAC control element.

The processor 610 configures a scheduling cell of a secondary cell in accordance with the cross carrier scheduling configuration information included in the cross carrier scheduling command MAC control element, and starts to monitor a PDCCH of the scheduling cell from a time predefined between the base station and a terminal.

The memory 630 stores instructions to be executed by the processor 610, or loads the instructions from a storage device (not shown) and temporarily stores them. The processor 610 executes the instructions that are stored or loaded in the memory 630.

The processor 610 and the memory 630 may be connected through a bus (not shown), and an input/output interface (not shown) may be connected to the bus. The input/output interface may be connected with the transceiver 620 and peripheral devices such as an input device, a display device, a speaker, and/or the storage device.

The cross carrier scheduling apparatus 600 described with reference to FIG. 6 may be included in the terminal or may be the terminal itself.

Referring to FIG. 7, a cross carrier scheduling apparatus 700 includes a processor 710, a transceiver 720, and a memory 730.

The processor 710 generates a cross carrier scheduling command MAC control element including cross carrier scheduling configuration information when changing a scheduling cell of a secondary cell set to a terminal. When the terminal successfully receives the MAC control element, the processor 710 configures the scheduling cell of the secondary cell, and indicates to transmit scheduling information at the secondary cell through a PDCCH of the configured scheduling cell from a time predetermined between a base station and the terminal.

The transceiver 720 transmits to the terminal the cross carrier scheduling command MAC control element including the cross carrier scheduling configuration information, and receives from the terminal an HARQ feedback, i.e., an ACK or a NACK to the MAC control element.

The memory 730 stores instructions to be executed by the processor 710, or loads the instructions from a storage device (not shown) and temporarily stores them. The processor 710 executes the instructions that are stored or loaded in the memory 730.

The processor 710 and the memory 730 may be connected through a bus (not shown), and an input/output interface (not shown) may be connected to the bus. The input/output interface may be connected with the transceiver 720 and peripheral devices such as an input device, a display device, a speaker, and/or the storage device.

The cross carrier scheduling apparatus 700 described with reference to FIG. 7 may be included in the terminal or may be the terminal itself.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A cross carrier scheduling method performed by a terminal, the method comprising:
   receiving a control element from a base station, the control element comprising cross carrier scheduling configuration information;
   setting a scheduling cell of a secondary cell, in accordance with the cross carrier scheduling configuration information; and
   monitoring scheduling information of the secondary cell at the scheduling cell, starting from a point in time at which a predetermined amount of time has elapsed from a transmission time of the control element,
   wherein the predetermined amount of time is predefined as a same value for the base station and the termininal, and
   wherein the cross carrier scheduling configuration information comprises a CIF-presence (carrier indicator field presence) in a case that the secondary cell is equal to the scheduling cell and a pdsch-start (physical downlink shared channel start) in a case that the secondary cell is different from the scheduling cell.

2. The method of claim 1, wherein the transmission time of the control element is included in a subframe of the frame in which the control element is transmitted.

3. The method of claim 1, wherein the predefined point in time comprises a point in time after a hybrid automatic retransmit request (HARQ) timing sent to the control element.

4. The method of claim 1, wherein the cross carrier scheduling configuration information further comprises:
   an index of the secondary cell, and
   an identifier of the scheduling cell.

5. The method of claim 4, wherein in response to the index indicating that the secondary cell is set to correspond to the terminal, setting the scheduling cell comprises:
setting the scheduling cell of the secondary cell to correspond to a scheduling cell indicated by the identifier.

6. The method of claim 1, wherein monitoring the scheduling information comprises:
monitoring the scheduling information of the secondary cell at the scheduling cell, in response to the secondary cell being in an activation state.

7. The method of claim 1, wherein the CIF-presence indicates that a CIF exists in a physical downlink control channel (PDCCH) of the secondary cell, and
wherein the pdsch-start indicates a position of a symbol on which the a physical downlink shared channel (PDSCH) of the secondary cell starts.

8. A cross carrier scheduling method performed by a base station, the method comprising:
transmitting a control element to a terminal, the control element comprising cross carrier scheduling configuration information;
receiving an acknowledgement (ACK) sent from the terminal in response to the terminal receiving the control element;
setting a scheduling cell of a secondary cell, in accordance with the cross carrier scheduling configuration information; and
indicating to transmit scheduling information of the secondary cell at the scheduling cell, from a point in time at which a predetermined amount of time has elapsed from a transmission time of the control element to which the ACK is received,
wherein the predetermined amount of time is predefined as a same value for the base station and the terminal, and
wherein the cross carrier scheduling configuration information comprises a CIF-presence (carrier indicator field presence) in a case that the secondary cell is equal to the scheduling cell and a pdsch-start (physical downlink shared channel start) in a case that the secondary cell is different from the scheduling cell.

9. The method of claim 8, wherein the transmission time of the control element is included in a subframe of the frame in which the control element is transmitted.

10. The method of claim 8, wherein the predefined point in time comprises a point in time after a timing of receiving the ACK.

11. The method of claim 8, wherein the cross carrier scheduling configuration information further comprises:
an index of the secondary cell, and
an identifier of the scheduling cell.

12. The method of claim 11, wherein in response to the index indicating that the secondary cell is set to correspond to the terminal, setting the scheduling cell comprises:
setting the scheduling cell of the secondary cell to correspond to a scheduling cell indicated by the identifier.

13. The method of claim 8, wherein indicating to transmit the scheduling information comprises:
indicating to transmit the scheduling information of the secondary cell at the scheduling cell in response to the secondary cell being in an activation state.

14. The method of claim 8, wherein the CIF-presence indicates that a CIF exists in a physical downlink control channel (PDCCH) of the secondary cell, and
wherein the pdsch-start indicates a position of a symbol on which the a PDSCH of the secondary cell starts.

15. A cross carrier scheduling apparatus, the apparatus comprising:
a transceiver configured to receive a control element from a base station, the control element comprising cross carrier scheduling configuration information; and
a processor configured to set a scheduling cell of a secondary cell in accordance with the cross carrier scheduling configuration information, and to monitor scheduling information of the secondary cell at the scheduling cell, starting from a point in time at which a predetermined amount of time has elapsed from a transmission time of the control element,
wherein the predetermined amount of time is predefined as a same value for the base station and the terminal, and
wherein the cross carrier scheduling configuration information comprises a CIF-presence (carrier indicator field presence) in a case that the secondary cell is equal to the scheduling cell and a pdsch-start (physical downlink shared channel start) in a case that the secondary cell is different from the scheduling cell.

16. The apparatus of claim 15, wherein the predefined point in time comprises a point in time after a hybrid automatic retransmit request (HARQ) timing sent to the control element.

17. The apparatus of claim 15, wherein the CIF-presence indicates that a CIF exists in a physical downlink control channel (PDCCH) of the secondary cell, and
wherein the pdsch-start indicates a position of a symbol on which the a PDSCH of the secondary cell starts.

18. A cross carrier scheduling apparatus, the apparatus comprising:
a transceiver configured to transmit a control element to a terminal, the control element comprising cross carrier scheduling configuration information, and to receive an acknowledgement (ACK) sent from the terminal in response to the terminal receiving the control element; and
a processor configured to set a scheduling cell of a secondary cell in accordance with the cross carrier scheduling configuration information, and to indicate to transmit scheduling information of the secondary cell at the scheduling cell, from a point in time at which a predetermined amount of time has elapsed from a transmission time of the control element to which the ACK is received,
wherein the predetermined amount of time is predefined as a same value for the base station and the terminal, and
wherein the cross carrier scheduling configuration information comprises a CIF-presence (carrier indicator field presence) in a case that the secondary cell is equal to the scheduling cell and a pdsch-start (physical downlink shared channel start) in a case that the secondary cell is different from the scheduling cell.

19. The apparatus of claim 18, wherein the predefined point in time comprises a point in time after a timing of receiving the ACK.

20. The apparatus of claim 18, wherein the CIF-presence indicates that a CIF exists in a physical downlink control channel (PDCCH) of the secondary cell, and
wherein the pdsch-start indicates a position of a symbol on which the a PDSCH of the secondary cell starts.

* * * * *